Nov. 13, 1956  R. J. DILLON  2,770,278
VEHICLE WHEEL CONSTRUCTION
Filed Feb. 18, 1952
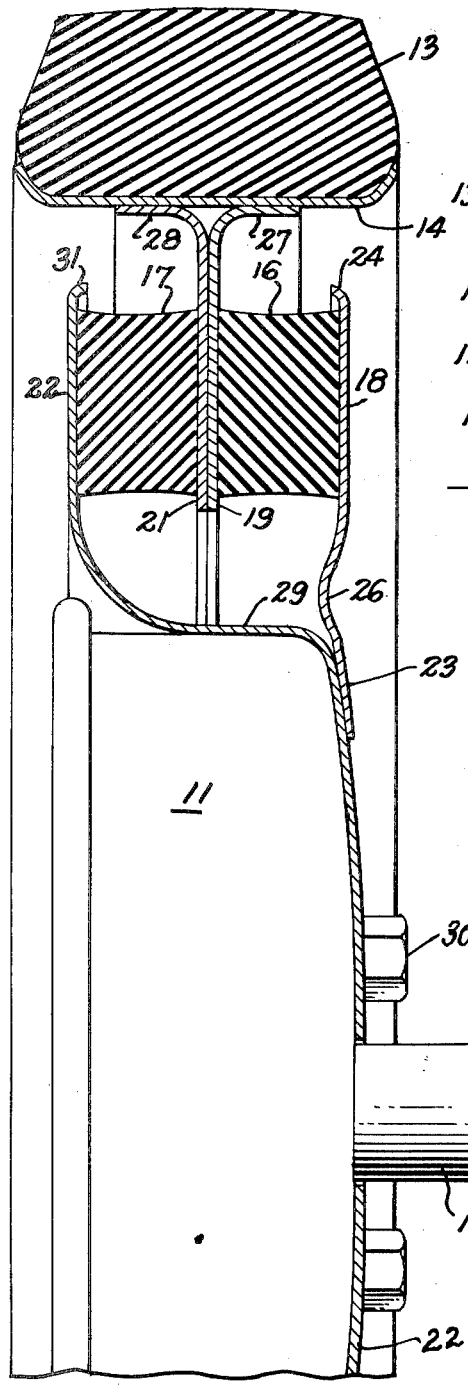
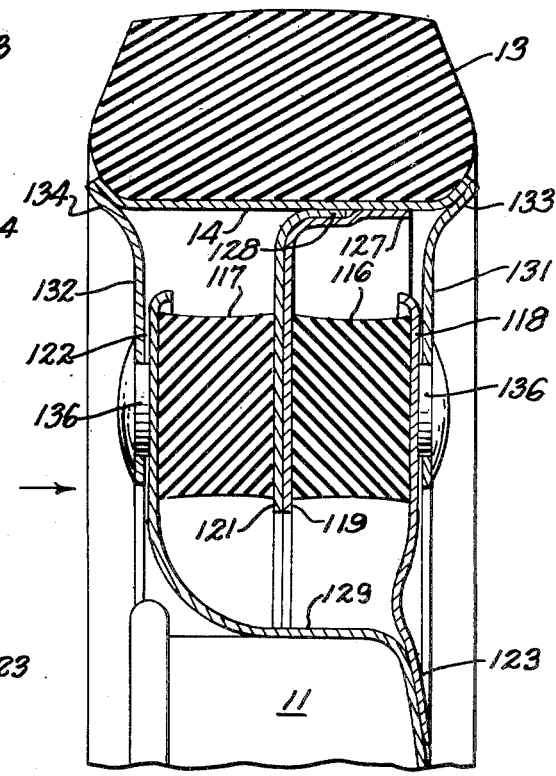
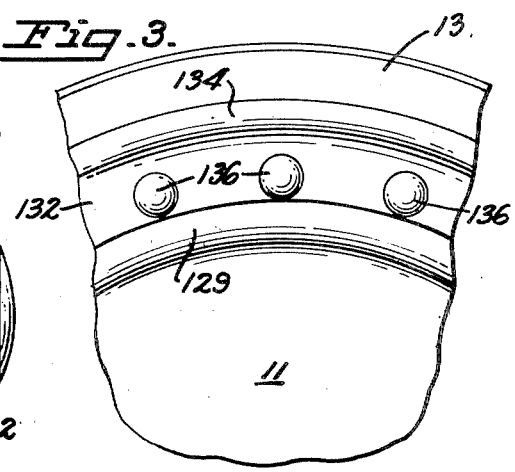
INVENTOR.
ROBERT J. DILLON
BY
ATTORNEY.

United States Patent Office 2,770,278
Patented Nov. 13, 1956

2,770,278

VEHICLE WHEEL CONSTRUCTION

Robert J. Dillon, San Francisco, Calif.

Application February 18, 1952, Serial No. 272,078

9 Claims. (Cl. 152—41)

The invention, in general, relates to load supporting members for mobile equipment, and more particularly relates to a tire-wheel structure which is especially adaptable for application to industrial or heavy duty road vehicles as well as military mobile equipment, although entirely applicable to mobile units of all types.

Vehicle tire constructions heretofore have been restricted, in the main, to two basic designs; namely, pneumatic tires and solid tires, the former principally being employed on passenger automobiles and light delivery trucks where operating stresses are moderate and, in multiple pairs, on multi-wheel heavy duty vehicles, while the latter are used on industrial heavy duty vehicles as well as on military mobile units. In the case of pneumatic tire design, shock loads are compensated by casing expansion and compression in the body of the tire, and variations in internal pressures result in varying overall tire diameter; pneumatic tires thus affording requisite resilience and load support under most operating conditions. In solid tire structures, which afford desired load supporting characteristics, the solid tire is stressed to a point of maximum resilience under ordinary operating conditions but no additional resilience is afforded therein for shock loads. In multi-wheel vehicles, the problem of equal weight distribution often gives rise to serious difficulty upon tire failure due to unequal pressures from one tire to another.

Some attention has heretofore been devoted to overcoming operational disadvantages of wheel structures under shock loads, such as blow-out or puncture in the case of pneumatic tire designs, and the absence of needed resilience in the case of solid tire structures. There have been recently developed a number of different types of so-called resilient car wheels wherein resilient material, bonded to metal plates, is interposed and retained in shear between inner and outer wheel members. These prior resilient car wheel structures are impractical and appreciably expensive to manufacture with the result that they are economically prohibitive to use, because of the complexity of assembly and increased number of parts for retention of the resilient material as well as the assembly inaccessibility of the bonded units interposed between the wheel hub and wheel rim for bonding operations, all resulting in increased time, material and labor for production. As is perhaps well known, the restrictions imposed by conventional bonding technique require that full accessibility from both sides of parts to be bonded with the resilient material, due to the necessity for applying heat and pressure in a uniform degree over the surfaces to be bonded, by means of a hydraulic or other type press. In the production of substantially all of the aforementioned prior resilient car wheels, production accessibility to both sides of the parts to be bonded is not had, most of such prior structures requiring an additional plate to provide the requisite bond thus making necessary a secondary means of assembling such plate to the wheel structure proper.

A primary object of my present invention is to provide a structure for incorporation in a tire-wheel embodying resilient material held in shear between a tread section and a wheel section wherein each face of the bonded parts are accessible for heat and pressure elements required for bonding; such structure on assembly constituting an integral resilient wheel structure.

Another important object of the invention is to provide an improved structure of the indicated nature wherein movement of the tread section under operating conditions is restricted to a plane perpendicular to the wheel axis.

A still further object of my invention is to provide an improved method of manufacturing a structure of the aforementioned character wherein the resilient material and retainer elements therefor are bonded together and wherein complete accessibility to both sides of the bonded parts is afforded in production to accomplish a highly efficaceous bond therebetween.

The foregoing and other objects are attained in a preferred embodiment of the invention which is illustrated in two exemplifications in the accompanying drawings, as applied to mobile units having moderate operating stresses as well as applied to mobile equipment operating under relatively sever stresses. It is to be understood also that my preferred method of manufacturing the aforesaid preferred embodiment is described herein although I am not to be limited either to the precise order of steps of manufacture set forth nor to the precise embodiments shown in the accompanying drawings, nor to the precise arrangement of the various parts thereof, as my invention, as defined in the appended claims, can be carried out in a plurality and variety of ways and embodied in a plurality and variety of forms.

Referring to the drawings:

Fig. 1 is a sectional front elevational view of a preferred embodiment of the invention, as exemplified in an application for vehicles where operating stresses are moderate.

Fig. 2 is a sectional front elevational view of a preferred embodiment of the invention as exemplified in an application for vehicles where operating stresses are relatively severe.

Fig. 3 is a fragmentary side elevational view of a preferred embodiment of my invention, as shown in Fig. 2, this view looking in the direction of the arrow of Fig. 2.

In its preferred form, the vehicle wheel construction of my present invention, as exemplified in a tire-wheel structure for vehicles operating under relatively severe stresses, preferably comprises a tread section, a wheel section, a pair of annular rubber members retained in shear intermediate said tread and wheel sections, and a pair of thrust rings connected to said tread section and disposed outside said annular members for limiting the movement of said tread section in relation to said wheel section to a straight line motion and for eliminating side-flexing or thrust movement in the wheel axis plane. As exemplified in a tire-wheel structure for vehicles where operating stresses are moderate, my improved vehicle wheel construction preferably comprises, a tread section, a wheel section, and a pair of annular rubber members retained in shear between said tread and said wheel sections. For vehicles where operating stresses are relatively light, my improvement may comprise a tread section, a wheel section, and at least one annular member retained in shear between said tread and wheel sections.

The preferred method of manufacturing the preferred embodiment of my invention, as exemplified in a tire-wheel structure for vehicles operating under relatively severe stresses, preferably comprises the steps of bonding an annular rubber member on its opposed faces directly to predetermined portions of circular metal elements leaving opposite portions of such elements projecting from the rubber member to provide a wheel section and a tread section, bonding a second annular rubber member on its opposed faces to predetermined portions of circular metal elements leaving opposite portions of the last named circular elements projecting from said second rubber member to provide a wheel section and a tread section, bringing the two bonded units into juxtaposition and radial alignment, securing a pair of thrust rings to said tread section so as to be disposed outside of said annular members, thus to provide a unitary structure which is removably mountable upon a wheel axle. As exemplified in a tire-wheel structure for vehicles having moderate operating stresses, the improved method is the same as set forth above except the step of providing thrust rings is eliminated.

As will appear from the following description, certain elements of my improved wheel structure may be extended to provide an integral wheel rim and wheel axle mounting member. Or, as illustrated in the annexed drawings, such elements may be radially extended and flanged so as to secure the same to a conventional wheel rim as well as to either a wheel brake drum or a wheel hub or other wheel mounting member. Accordingly, as shown particularly in Fig. 1 of the drawings, my improved vehicle wheel construction as exemplified in a vehicle having moderate operating stresses preferably comprises a wheel section which may include a wheel brake drum 11 mounted on a wheel axle 12, and a tread section which may consist of a solid rubber casing 13 detachably mounted on a wheel rim 14, such detachable mounting being optional.

In accordance with the present invention, the exemplification of Fig. 1 preferably includes a pair of annular rubber members 16 and 17 interposed between the wheel section and the tread section of a vehicle wheel structure and retained in shear by means of continuous circular metal elements to which the rubber members are bonded. As shown, the opposed faces of annular rubber member 16 are bonded directly to predetermined portions of continuous circular elements 18 and 19 which preferably are fabricated of pressed steel, while the opposed faces of annular rubber member 17 are bonded directly to predetermined portions of continuous circular metal elements likewise preferably fabricated of pressed steel. The circular elements 18, 19, 21 and 22 are radially extended to provide wheel sections and tread sections and, as indicated above, can be so extended as to afford a complete wheel rim upon which the solid rubber casing 13 can be mounted as well as a complete wheel mounting member so that the structure can be detachably mounted as a unit on the wheel axle of a vehicle. In the exemplification illustrated in Fig. 1 of the annexed drawings, continuous circular element 18 preferably is radially extended from the portion thereof bonded to annular rubber member 16 to provide a wheel section 23, having an appreciable welding surface, and conveniently being welded to a portion of the continuous circular element 22 as hereinafter explained. In order to provide desirable additional strength to continuous element 18, I preferably provide a flange 24 thereon adjacent the tread section of the structure, as well as provide an off-set therein, as at 26, adjacent to the wheel section. Continuous circular element 19 is radially extended to provide the tread section and is flanged, as at 27, to afford an appreciable welding surface and element 19 is secured to the tread section, preferably by welding the flange 27 directly to the inner surface of the wheel rim 14.

It is to be especially observed that the annular rubber member 16 is so arranged in relation to the retainer elements therefor, consisting of the continuous circular metal elements 18 and 19, that the opposed faces of the annular rubber member 16 engage and are bonded to predetermined sections or portions of the elements 18 and 19 lying adjacent to their inner termini. Thus, there is complete accessibility of the parts to be bonded; namely, the opposed faces of annular rubber member 16 and the inner termini portions of the continuous circular elements 18 and 19, for the heat and pressure elements required for bonding such parts together. A similar situation and arrangement prevails with respect to the annular rubber member 17 and the retainer elements therefor consisting of the continuous circular elements 21 and 22 to which the opposed faces of rubber member 17 are bonded at predetermined portions of the elements.

In like manner to the other retainer elements, continuous circular element 21 constituting in part a tread section is radially extended and flanged, as at 28, to afford an appreciable welding surface, and element 21 is secured, preferably by welding, directly to the inner surface of rim 14. The continuous metal element 22 not only is radially extended to provide a wheel section but also is doublebent, as at 29, to extend toward element 18 as well as to underlie wheel section 23 of continuous metal element 18; the element 22 snugly engaging the wheel brake drum 11, and the element 18 being secured at wheel section 23 thereof directly to the element 22 at the wheel section. Continuous metal element 22 likewise is strengthened as in the case of metal element 18 by providing a flange thereon, as at 31, adjacent to the rim 14, as shown. The entire assembly of the rim 14, annular members 16 and 17, together with the continuous circular metal elements 18, 19, 21 and 22, as an integral unit, is removably mountable on the wheel brake drum 11, or upon a wheel hub or other mounting member for a wheel axle, in a conventional manner similar to the mounting of a standard pressed wheel, by means of suitable lugs 30 which extend through openings in the element 22, and which are threaded into threaded openings, not shown, in the wheel brake drum 11, or in the wheel hub as the case may be. As illustrated, the continuous circular element 22 is provided with a large central dished portion adapted to surround and engage the wheel brake drum 11 or wheel hub as the case may be.

Reference is now made to the showing of Fig. 2 wherein I have illustrated a preferred embodiment of my present invention for application to vehicles where operating stresses are relatively severe. In this exemplification, the tire-wheel structure comprises a wheel section including a wheel brake drum 11, or a wheel hub as the case may be, mounted on a wheel axle, not shown, together with a tread section consisting of a solid rubber tire 13 mounted on a wheel rim 14. In addition, I provide intermediate the wheel section and the tread section a pair of annular rubber members 116 and 117 which are arranged in juxtaposition and in radial alignment, all in the same manner as in the case of the exemplification of Fig. 1. As shown, the annular member 116 is retained in operative position and in shear by being bonded on its opposed faces alternately with the wheel section and with the tread section, and the annular rubber member 117 is retained in operative position in shear by being bonded on its opposed faces alternately with the tread section and with the wheel section.

In accordance with the present invention, as exemplified in the embodiment of Fig. 2 of the drawings, the retaining elements for the annular rubber member 116 include a continuous circular metal element 118, preferably fabricated of pressed steel and to which the annular member 116 is bonded, which is radially extended to provide a wheel support portion 123 having an appreciable welding surface for securing the element, preferably by welding, to a wheel support element 122 hereafter explained. The retaining elements for member 116 also include a continuous circular element 119, also preferably fabricated of pressed steel and to which the member 116 is bonded. The circular element 119 constitutes a rim support and is radially extended toward the tread section and flanged, as at 127, to afford an appreciable welding surface, and the element 119 is secured to the inner surface of rim 14, preferably by welding, as hereinafter explained. The retaining elements for the annular rubber member 117 preferably include continuous circular metal elements 121 and 122, preferably fabricated of pressed steel, to which the opposed faces of the annular member 117 are bonded. Element 121 constitutes a rim support and is radially extended toward the tread section and flanged, as at 128, to afford an appreciable welding surface, and such element is secured, preferably by welding, directly to the inside surface of rim 14. As shown in Fig. 2, the flanged portion 127 of rim support 119 is in part welded to the flanged portion 128 of element 121 and in part secured directly to the inner surface of rim 14 by welding. In addition, the continuous circular metal element 122 to which the annular member 117 is bonded, as shown, is radially extended toward the wheel section and double-bent, as at 129, toward the element 118 as well as around the brake drum 11 to underlie the wheel support portion 123 of element 118; the latter element being welded at portion 123 directly to the circular element 122. Thus, a unitary entire assembly is afforded which is removably mounted on the wheel brake drum 11, or a wheel hub as the case may be, in the same manner and by means of the same elements as in the case of the exemplification of Fig. 1.

In accordance with the present invention, as exemplified in the embodiment applicable to vehicles operating on relatively severe stresses, I also provide a pair of thrust rings 131 and 132 which are movably mounted with respect to and outside of the continuous circular elements 118 and 122, respectively, in order to provide protection against undue thrust or side-flexing and to maintain positive alignment of resilient members as well as to restrict movement to a plane perpendicular to the wheel axis. The thrust rings are formed with rim supports 133 and 134, respectively, and by such supports are secured to the inner surface of rim 14, preferably by welding. In order to reduce wear due to friction, a plurality of oil-impregnated or other anti-friction bearing inserts 136, are fitted into suitable recesses provided in the thrust rings 131 and 132 at spaced intervals circumferentially about the tire-wheel structure of this exemplification; such arrangement of anti-friction inserts being more particularly illustrated in Fig. 3 of the accompanying drawings. This thrust ring construction limits the movement of the tread section in relation to the wheel axle to a straight line motion, and does not permit side-flexing or thrust movement in the wheel axis plane.

It is to be especially observed that in my improved tire-wheel structure, hereinabove described and as illustrated, operating stresses normally occurring through surface engagement of the tires during movement of the vehicle along a road, which in all prior vehicle tire constructions consist largely of a compression in a single direction, are in shear or consist of compression in one direction with an elongation in the same ratio in a perpendicular direction. This result is afforded by the mounting and retention of annular rubber members in shear intermediate the wheel section and the tread section so that operating stresses are transmitted in shear. By such construction, equal load capacity and tire diameter as well as maximum and optimum resilience are assured under all operating conditions; longevity of use will be had as well as facile manueverability, durability, and maintenance is reduced to a minimum.

Moreover, the improved tire-wheel of the present invention can be inexpensively manufactured. For example, and with reference to the exemplification of Fig. 1 of the annexed drawings, production steps can be carried out in the following manner. As a first assembly, annular member 16 and continuous circular elements 18 and 19 being available, the annular member is bonded on its opposed faces directly to end or inner termini portions of the circular elements, leaving the wheel section of circular element 18 extending or projecting from the annular member 16 and also leaving the rim section of the circular element 19 projecting from the annular member, as shown. The assembly operation just set forth can be carried out in any part of the plant and, as especially to be noted, there not only are no projections or irregularities on circular continuous elements 18 and 19, as such surfaces are planar and smooth, but these parts to be bonded are completely accessible for the heat and pressure elements required for bonding. Thereafter, or simultaneously therewith in another portion of the plant, a second assembly operation may be carried out in connection with annular rubber member 17 and its retainer circular elements 21 and 22, with all such members available. That is to say, the annular member 17 is bonded on its opposed faces to the end or inner termini portions of the elements 21 and 22, leaving a flanged tread portion or section of element 21 projecting from the annular member, and likewise leaving a wheel section of circular element 22 projecting from the annular member 17. Again, it is to be noted that uninterrupted, smooth planar surfaces are provided for bonding, there being no projections or irregularities in these parts, and the parts to be bonded are completely accessible for heat and pressure elements required in the bonding operation. With the aforesaid two assembly operations completed, a third assembly would comprise the bringing together of the two annular rubber members, as bonded to the circular elements 18, 19, 21 and 22, into contiguous relationship or juxtaposition adjacent to the rim 14, and thereafter welding the flanges of the circular metal elements 19 and 21 directly to the inner surface of the rim, as well as welding the wheel section 23 of element 18 directly to the element 22 adjacent to its engagement with the drum 11. There is thus provided an integral or unitary structure which can be removably mounted in the conventional manner by means of the lugs 30 upon the wheel brake drum 11, or upon a wheel hub as the case may be, and the solid tire 13 mounted upon rim 14.

In a similar manner, the production of the exemplification of Fig. 2 and Fig. 3 can be economically assembled and inexpensively produced. The first as well as second assembly operation in connection with this exemplification can be carried out in the same manner as the first two assembly operations employed in connection with the exemplification of Fig. 1. As a third assembly operation, the two annular rubber members 116 and 117, together with the continuous circular elements 118, 119, 121 and 122 bonded thereto, are brought into juxtaposition and the flange 128 of element 121 is welded directly to the inner surface of rim 14 while flange 127 of element 119 is welded in part to the inner surface of the rim 14 and in part to the flange 128 of circular element 121. In this same operation, wheel section 123 of circular element 118 is welded to circular element 122 adjacent to the wheel section thereof. Thereafter, the thrust rings 131 and 132 are disposed on the outside of circular elements 118 and 122 and the rim support portions 133 and 134 of thrust rings 131 and 132, respectively, are welded to the rim 14. As a final step, the oil-impregnated inserts, or other anti-friction bearing inserts, are fitted into the openings provided in the thrust rings 131 and 132. The entire integral or unitary assembly consisting of rim 14, annular rubber members 116 and 117, together with the circular elements 118, 119, 121 and 122 bonded to the rubber elements 116 and 117, and the thrust rings 131 and 132, is removably mountable as a unit upon a wheel brake drum 11, or upon a wheel hub or a wheel axle as the case may be, in a manner similar to the mounting of a pressed wheel, by means of suitable lugs and suitably threaded apertures in the brake drum or wheel hub, and thereafter the solid rubber casing 13 mounted on the rim 14.

I claim:

1. A vehicle wheel construction comprising, in combination with a wheel brake drum, a unitary structure removably mounted on the wheel brake drum and consisting of a wheel rim, a first continuous circular element having a relatively large dished portion for receiving the wheel brake drum as well as having a plurality of small openings therein at circumferentially spaced intervals adjacent said large dished portion for receiving lugs for attaching said first element to the wheel drum, a second circular element secured to said wheel rim, a first annular rubber member bonded on its opposite faces to said first and second circular elements intermediate said wheel rim and the wheel brake drum, a third circular element secured to said wheel rim and disposed adjacent to said second circular element, a fourth circular element secured to said first element adjacent to the wheel brake drum, a second annular rubber member bonded on its opposite faces to said third and said fourth elements and disposed in juxtaposition with respect to said first annular rubber member, and a pair of thrust rings secured to said wheel rim and disposed outside of and in juxtaposition to said first and fourth circular elements.

2. A vehicle wheel construction as defined in claim 1 wherein each of said thrust rings has a plurality of recesses therein arranged in circumferentially spaced relation, and an anti-friction bearing in each of said recesses.

3. A vehicle wheel construction comprising, in combination with a wheel brake drum, a unitary structure removably mounted on the wheel brake drum and consisting of a wheel rim, a first circular element having a relatively large central dished portion for receiving the wheel brake drum as well as having a plurality of relatively small openings adjacent said large dished portion for enabling attachment of the structure to the wheel brake drum, a second circular element secured to said wheel rim, a first annular rubber member bonded on its opposite faces to said first and second circular elements and disposed between said wheel rim and the wheel brake drum, a third circular element secured to said wheel rim and disposed adjacent to said second element, a fourth circular element secured to said first circular element adjacent to the wheel brake drum, a second annular rubber member bonded on its opposite faces to said third and said fourth circular elements and disposed in juxtaposition with respect to said first annular rubber member, a pair of thrust rings secured to said wheel rim and disposed outside of and in juxtaposition to said first and fourth circular elements, and a solid rubber casing on said wheel rim.

4. A vehicle wheel construction as defined in claim 3 wherein each of said thrust rings has a plurality of recesses therein arranged in circumferentially spaced relation, and an anti-friction device in each of said recesses.

5. A method of manufacturing a tire-wheel structure, said method comprising the steps of providing a wheel rim, providing a first continuous circular element having a large central dished portion for receiving the wheel brake drum of a vehicle and having a plurality of small openings therein adjacent to the central dished portion, providing a second, third and fourth continuous circular element; each of said elements having smooth uninterrupted surfaces in one portion thereof, providing a pair of annular rubber members, bonding one of said members on its opposite faces to said first and said second circular elements at the smooth uninterrupted portions thereof leaving portions of said elements projecting in opposite directions from the portions thereof bonded to said first annular rubber member, welding the projecting portion of said second element to said wheel rim, bonding the other of said pair of annular rubber members on its opposite faces to said third and fourth circular elements at the smooth uninterrupted portions thereof leaving portions of said third and fourth elements projecting in opposite directions from the portions thereof bonded to said other rubber member, welding said third element to said wheel rim, welding said fourth element to said first element adjacent to the central dished portion thereof, providing a pair of thrust rings, securing each of said thrust rings to said wheel rim outside of said first and fourth circular elements, and then mounting a solid rubber casing on said wheel rim; the united assembly of said wheel rim, said solid rubber casing, said circular elements, said annular rubber members and said thrust rings being adapted to be removably mounted on the wheel brake drum as an integral structure.

6. A method of manufacturing an integral tire-wheel structure for removable mounting upon a wheel axle, said method affording accessible surfaces for bonding operations and comprising the steps of providing a wheel rim, mounting a solid rubber casing on said rim, providing a pair of annular rubber members, providing four continuous circular metal elements each having a smooth uninterrupted surface portion readily accessible for bonding; one of said circular metal elements having a relatively large central dished portion for enabling removable mounting of the unitary structure upon a wheel axle, bonding one of said annular rubber members on its opposite faces to the smooth uninterrupted surface portions of two of said elements leaving portions of said elements projecting in opposite directions from the portions bonded to said member, bonding the other of said annular rubber members to the remaining two of said circular elements at the accessible smooth uninterrupted surface portions thereof leaving portions thereof projecting in opposite directions from the portions bonded to said other annular member, bringing said annular rubber members with the bonded circular elements into juxtaposition with two of said circular elements in contiguous relationship, welding the two circular elements in contiguous relationship directly to said wheel rim, and then securing a pair of thrust rings to said wheel rim to depend outside of said annular rubber members; the integral structure thus formed being adapted to be removably mounted as a unit upon a wheel axle of a vehicle.

7. A method of manufacturing an integral tire-wheel structure as defined in claim 6, and the added step of inserting a plurality of anti-friction bearings at circumferentially spaced intervals in said thrust rings.

8. A method of manufacturing an integral tire-wheel structure for removable mounting upon a wheel axle of a vehicle, said method affording the retention of annular rubber members in shear between the tread section and wheel section of the vehicle and affording readily accessible bonding surfaces for bonding operations in securing the annular rubber members in operative positions; said method comprising the steps of providing a wheel rim, providing a pair of annular rubber members, providing four continuous circular metal elements each having an extended portion with a smooth uninterrupted surface in a section thereof, arranging said elements to dispose said extended portions alternately toward the wheel section and the tread section, bonding opposed faces of each of said annular rubber members alternately with said elements on the extended portions and at the smooth uninterrupted surface sections thereof, bringing said elements together with said bonded annular members in contiguous relationship, and then welding together the portions of said elements extending toward the wheel section, and welding the portions of said elements extending toward the tread section to said wheel rim.

9. A vehicle wheel construction for absorbing shock loads from contacting any random surface in the operation of a vehicle, including aircraft in landing operations, said wheel construction comprising a wheel section, a first pair of continuous circular elements secured to said wheel section in spaced relationship, a tread section, a second pair of continuous circular elements secured to said tread section in spaced relationship; said second pair of circular elements being disposed between said first pair of circular elements, a pair of annular rubber members retained in shear by said first and second pair of circular elements and intermediate said wheel section and said tread section; the retention of said annular members being such as to utilize the full elastic properties of said rubber members in shear which are capable of appreciable deflection whereby shock loads transmitted by said tread section are substantially absorbed by said annular rubber members, a pair of thrust rings secured to said tread section to depend outside of each of said first pair of circular elements; each of said thrust rings having a plurality of recesses therein arranged in circumferentially spaced relation, and an anti-friction bearing in each of said recesses engaging at all times the surface of an adjacent circular element of said first pair of circular elements.

References Cited in the file of this patent

UNITED STATES PATENTS

| | | |
|---|---|---|
| 1,055,835 | Tighe | Mar. 11, 1913 |
| 1,076,003 | Cook | Oct. 14, 1913 |
| 1,486,442 | Lord | Mar. 11, 1924 |
| 1,638,621 | De Araujo | Aug. 9, 1927 |
| 2,069,952 | Hoffman | Feb. 9, 1937 |
| 2,464,102 | Schulze | Mar. 8, 1949 |
| 2,476,173 | Zintsmaster | July 12, 1949 |